US011115646B2

(12) United States Patent
Briggs et al.

(10) Patent No.: US 11,115,646 B2
(45) Date of Patent: Sep. 7, 2021

(54) EXPOSURE COORDINATION FOR MULTIPLE CAMERAS

(71) Applicant: Woven Planet North America, Inc., Los Altos, CA (US)

(72) Inventors: Forrest Samuel Briggs, Palo Alto, CA (US); James Allen-White Hoffacker, San Carlos, CA (US); Dhruv Lamba, San Mateo, CA (US); Phillip Sawbridge, Los Altos, CA (US)

(73) Assignee: Woven Planet North America, Inc., Los Altos, CA (US)

(*) Notice: Subject to any disclaimer, the term of this patent is extended or adjusted under 35 U.S.C. 154(b) by 0 days.

(21) Appl. No.: 17/063,254

(22) Filed: Oct. 5, 2020

(65) Prior Publication Data

US 2021/0092349 A1 Mar. 25, 2021

Related U.S. Application Data

(63) Continuation of application No. 16/298,905, filed on Mar. 11, 2019, now Pat. No. 10,798,368.

(Continued)

(51) Int. Cl.
*H04N 13/296* (2018.01)
*H04N 5/235* (2006.01)
(Continued)

(52) U.S. Cl.
CPC ......... *H04N 13/296* (2018.05); *G05D 1/0251* (2013.01); *G06K 9/00791* (2013.01);
(Continued)

(58) Field of Classification Search
CPC .. H04N 13/296; H04N 13/239; H04N 13/243; H04N 5/2351; H04N 5/2353;
(Continued)

(56) References Cited

U.S. PATENT DOCUMENTS

2013/0106990 A1* 5/2013 Williams ........... H04N 5/23238
348/36
2014/0022381 A1* 1/2014 Heinold ................ G01J 3/2803
348/135

(Continued)

*Primary Examiner* — Allen C Wong
(74) *Attorney, Agent, or Firm* — Christopher G. Darrow; Darrow Mustafa PC

(57) ABSTRACT

In particular embodiments, a computing system may detect a number of objects captured within an overlapping region between a first field of view associated with a first camera and a second field of view associated with a second camera. The system may determine a respective priority ranking for each of the objects. The system may select an object from the objects based on the respective priority ranking for the object. The system may determine, for the first camera, a first lighting condition associated with the first field of view. The system may determine, for the second camera, a second lighting condition associated with the second field of view. The system may determine a shared exposure time for the selected object based on the first lighting condition and the second lighting condition. The system may cause at least one image of the selected object to be captured using the shared exposure time.

20 Claims, 10 Drawing Sheets

Related U.S. Application Data

(60) Provisional application No. 62/642,548, filed on Mar. 13, 2018.

(51) Int. Cl.
  *G06K 9/00* (2006.01)
  *G06T 7/593* (2017.01)
  *H04N 13/243* (2018.01)
  *G05D 1/02* (2020.01)
  *H04N 13/239* (2018.01)

(52) U.S. Cl.
  CPC ............ *G06T 7/593* (2017.01); *H04N 5/2351* (2013.01); *H04N 5/2353* (2013.01); *H04N 13/239* (2018.05); *H04N 13/243* (2018.05); *G05D 2201/0213* (2013.01); *G06T 2207/20081* (2013.01); *G06T 2207/30252* (2013.01)

(58) Field of Classification Search
  CPC ........... G06T 7/593; G06T 2207/20081; G06T 2207/30252; G05D 1/0251; G05D 2201/0213; G06K 9/00791
  USPC .......................................................... 348/48
  See application file for complete search history.

(56) References Cited

U.S. PATENT DOCUMENTS

2014/0347475 A1\* 11/2014 Divakaran ......... G06K 9/00771
  348/135
2018/0348596 A1\* 12/2018 Reed ..................... G02B 7/006

\* cited by examiner

EXPOSURE COORDINATION FOR MULTIPLE CAMERAS

PRIORITY

This application is a continuation under 35 U.S.C. § 120 of U.S. patent application Ser. No. 16/298,905, filed 11 Mar. 2019, now issued as U.S. Pat. No. 10,798,368, which claims the benefit under 35 U.S.C. § 119(e) of U.S. Provisional Patent Application No. 62/642,548, filed 13 Mar. 2018, which is incorporated herein by reference.

BACKGROUND

Stereo cameras may include multiple cameras or multiple lenses with each lens having a separate image sensor. Different cameras in a stereo camera pair may have overlapping fields of view to allow the cameras to capture the stereo information such as depth and distance information of objects. A same object may be captured by different cameras within a stereo camera pair with each camera capturing the images from a different angle. The stereo cameras may provide data for generating three-dimensional images based on the images from each camera. Computer vision based on stereo cameras are be applicable in many technological fields, for example, robots, drones, vehicles, etc. As an example, a vehicle may use stereo cameras to monitor its environment to help the vehicle navigation. The vehicle may use stereo cameras for recognizing hazards, roads, lane markings, etc. Data from stereo cameras may be used by a navigation system to safely guide the vehicle, with or without the aid of a human driver.

Traditional automatic exposure may independently personalize the exposure time of each camera in the stereo camera pair or group based on the lighting conditions in the field of view (FOV) of each camera. However, personalizing exposure time of each camera independently may cause problem in some applications. For example, for vehicle applications, an object may be within the shared FOV of multiple cameras and may appear to be very different in the images captured by different cameras because the FOVs of those cameras have different lighting conditions. The dissimilarity for the same object in different images captured by different cameras may prevent the vehicle from recognizing the object correctly, and consequently may negatively impact the vehicle for reacting accordingly.

DESCRIPTION OF EXAMPLE EMBODIMENTS

Figure 1:
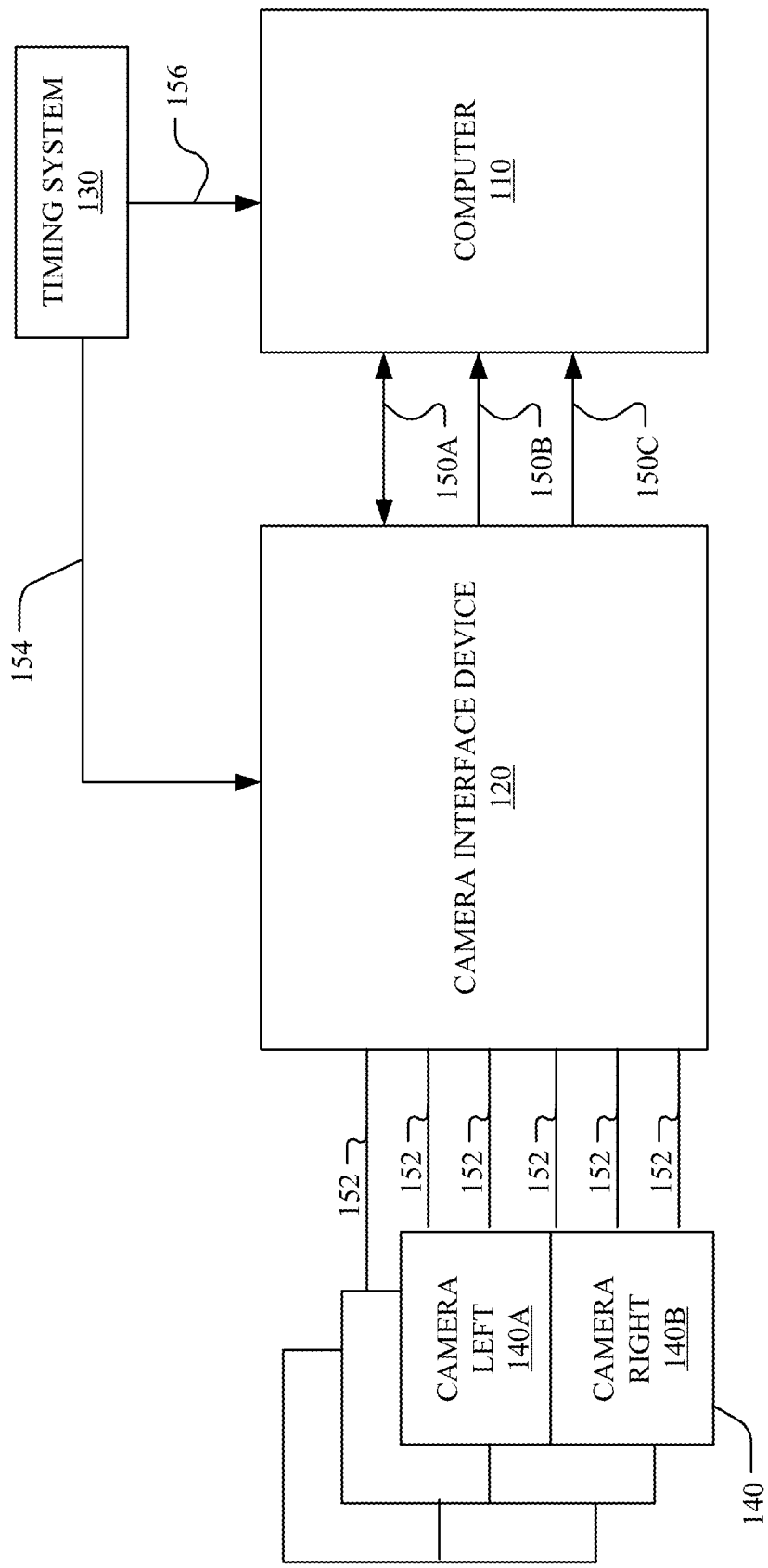
FIG. 1 illustrates an example camera system including a number of stereo camera pairs connected to a computer through a camera interface device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A stereo camera pair or group may include multiple cameras or multiple lenses with each lens having a separate image sensor to capture the stereo information (e.g., depth and distance information) of objects. Different cameras of a stereo camera pair or group may have overlapping fields of view. A same object may be captured by multiple cameras within a stereo camera pair or stereo camera group from different angles. The images captured by the stereo cameras may be used for generating three-dimensional images. Computer vision based on stereo cameras are be applicable in many technological fields, for example, robots, drones, vehicles, etc. As an example, a vehicle may use stereo cameras to monitor its environment to help the vehicle navigation. The vehicle may use the cameras for recognizing hazards, roads, lane markings, etc. Data from stereo cameras may be used by a navigation system to safely guide the vehicle, with or without the aid of a human driver.

However, traditional automatic exposure may independently personalize the exposure time of each camera in the stereo camera pair or group based on the lighting conditions in the field of view (FOV) of each camera. Personalizing exposure time of each camera independently may cause problem in some applications. As an example, for vehicle applications, an object may be within the shared FOV of multiple cameras and may appear to be very different in the images captured by different cameras because the FOVs of those cameras have different lighting conditions. The dissimilarity for the same object in different images captured by different cameras may prevent the system from recognizing the object correctly, and consequently may negatively impact the vehicle for reacting accordingly.

Particular embodiments of the system provide a technical solution to these problems by coordinating multiple cameras within a stereo camera pair or group to take pictures using a coordinated exposure time. It is notable that the vehicle applications are used as example applications in this disclosure, but the invention is not limited to the vehicle applications. Particular embodiments of the system may be applicable to many technological fields including, for example, but not limited to, computer vision, robots, drones, vehicle navigation, or any application involving cameras. It is also notable that, for vehicle applications, particular embodiments may be applicable to any vehicles including, for example, but not limited to, an autonomous vehicle, a driver-driven vehicle, a computer-assisted vehicle, a human-computer hybrid driving vehicle, etc.

In particular embodiments, a vehicle (e.g., an autonomous vehicle, a driver-driven vehicle, a computer-assisted vehicle, a human-computer hybrid driving vehicle, etc.) may include a system having a variety of sub-systems or modules for enabling the vehicle to determine its surroundings and safely navigate to target destinations. In particular embodiments, the system may include, for example, but are not limited to, a computer, sensor arrays, cameras, LiDAR systems, RADARs, stereo vision systems, ultra sound systems, a global positioning system (GPS), inertial measurement units, accelerometers, gyroscopes, odometer systems, or other related systems. The computer may include one or more central processing units, graphical processing units (GPUs), memory, and storage for controlling various operations of the vehicle, such as driving and navigating. The sensor arrays may include a number of cameras organized as stereo camera pairs. Each camera may include an image sensor that is configured to capture individual photo images or a series of images as a video. The cameras may have high dynamic resolution (HDR) capability. In particular embodiments, multiple cameras may have overlapping fields of view (FOVs). In particular embodiments, the multiple cameras having overlapping FOVs may have a common field of view area shared by all the FOVs of these cameras. In particular embodiments, the multiple cameras having the shared field of view may belong to the same stereo camera pair or different stereo camera pairs. The same object may be within the shared view area of the FOVs of multiple cameras, and consequently may be included in the images of multiple cameras. The computer system may coordinate and synchronize the cameras to generate a video stream composed of a series of images of the surrounding environment of the vehicle. The video stream, together with data from other sensors or modules, may be sent to the computer for processing and analyzing. The computer may include a machine learning (ML) model within the one or more of GPUs. The ML model may be used to detect the objects of interest (i.e., the objects of interest) in the images, such as, a car, a human, or a pet. A sensor fusion algorithm may construct 3D models for the surrounding environment using the images of multiple cameras. The system may extract perception and depth information from the 3D models to make decisions for driving and navigating to safely guide the vehicle.

Successful and safe navigation of an AV may depend on making appropriate decisions in response to the external environment. Making appropriate decisions may, in turn, depend at least in part on recognizing the objects correctly from the images taken by the cameras. A camera with traditional automatic exposure may independently personalize the shutter speed and exposure time based on the lighting conditions in the FOV of the camera. For example, when the FOV of the camera is very bright, the camera may adopt a short exposure time determined by the automatic exposure to dim the image and avoid saturation. On other hand, when the FOV of the camera is very dark, the camera may adopt a long exposure time determined by the automatic exposure to increase the exposure and avoid extremely dark images.

Although the traditional automatic exposure may work well for individual camera, in vehicles, personalizing each camera exposure time individually and independently may cause problems with a sensor fusion algorithm. For example, an object may be included in the images of multiple cameras if the object is within the shared overlapping area of the FOVs of these cameras. To properly generate a model of the environment, the system may rely on being able to accurately detect the object from multiple images and recognize that it is the same object. However, when the lighting conditions in the FOV of each camera are different, each camera may adopt different exposure time using the individualized automatic exposure. As a result, the same object may appear to be very different in the images of different cameras. The dissimilarity of the same object in different images may prevent the system from correctly modeling the surrounding environment.

For example, an object of interest (e.g., a car, a human, or a pet) may be within the shared overlapping area of the FOVs of multiple cameras. For one camera, its FOV may include the object of interest and a very bright light source such as the sun. The FOV of the camera may be very bright for the area including the sun. The camera, with individualized automatic exposure, may reduce the exposure time or drop the gain to make the bright area dimmer in order to keep the sun from being washed out by saturation. However, the short exposure time may dim the object of interest in the image, making its features and pixels dark and unrecognizable. For a second camera, its FOV may include the same object of interest as the one appearing in the FOV of the aforementioned camera and a relatively dark area which may include other objects. The overall FOV of the second camera, compared to the FOV of the first camera, may be relatively dark. Consequently, the second camera, using individualized automatic exposure, may increase the exposure time to make the overall image relatively brighter to keep the objects in dark visible. However, this may lead to over-exposure for the object of interest because of the long exposure time, resulting in the object of interest appearing "washed out" due to overexposure. A third camera that also has the object of interest in its FOV may not have any extreme lighting conditions (either overly bright or overly dark regions), and as a result the third camera may capture the object of interest using yet another exposure time. Therefore, the same object may appear very differently in the images of these cameras (e.g., with different shades of color and feature details). Although visual information for the object of interest may not be totally lost because of the HRD capability of the cameras, the dissimilarity of the same object in different images may be great enough to prevent the object being recognized correctly, and consequently may negatively impact the vehicle system for constructing the 3D model of the object correctly and for reacting accordingly.

In order to solve this problem, rather than determining the exposure time of each camera individually, in particular embodiments, the vehicle system may determine an optimal exposure time for multiple cameras having overlapping FOVs based on the lighting conditions in all the FOVs of these cameras. In particular embodiments, the system may determine the appropriate exposure time based on the overlapping region that is shared by the FOVs of the cameras (i.e., regions that are not shared would not be used to determine exposure, or such regions would be considered but given less weight). IPE, the system may additionally or alternatively limit its exposure determination to be based on particular predetermined regions in the scene (e.g., if the objects of interest are vehicles and pedestrians, exposure may be determined based on the bottom half of what the image sensors detect and not include the upper half where the sun or other light source may appear). In particular embodiments, exposure may be determined based on particular objects of interest detected in the scene. For example, a machine learning (ML) algorithm may detect the object of interest in the overlapping area of the FOVs of the multiple cameras. The system may compute the optimal exposure time (e.g., a weighted average) for these cameras based on the lighting conditions of each camera's FOV in order to minimize differences in appearance of the objects of interest in different pictures. The multiple cameras may jointly contribute to the optimized decision for the exposure time. The system may coordinate these cameras to take pictures with the optimal exposure time. The coordinated autoexposure may allow the coordinated cameras to be scene-aware for determining the exposure time. A sensor fusion algorithm may detect the correlation of multiple images including the object of interest and construct 3D models of the environment based on the multiple images of these cameras. The system may make decisions based on the 3D models and guide the vehicle safely in response to the modeled environment.

More specifically, particular embodiments of the system may include a computer, one or more camera interface devices, and a number of stereo camera pairs. The computer may include one or more graphic processing units (GPUs). The computer may be coupled to the one or more camera interface devices associated with the stereo camera pairs. In particular embodiments, the computer may perform operations in accordance with the ML model using one or more of the CPUs and/or graphic GPUs of the computer or access a cloud-based ML model through a connection to the cloud. The system may use the ML model to detect the objects of interest. In particular embodiments, the ML model may be a convolutional neural network (CNN) for detecting objects, such as, a human, a car, a bicycle, or a pet. The object of interest may be within a shared overlapping area of the FOVs of multiple cameras. The system may coordinate the cameras to take pictures using the optimal exposure time to minimize discrepancies in how the object appears across images due to varying lighting conditions.

As an example and not by way of limitation, the vehicle may be driving on the road at a time before sunset. A first camera of the vehicle system may have the FOV including a car and the sun. A second camera of the vehicle system may have the FOV including the same car but without the sun. The overall lighting condition of the first camera's FOV may be brighter and the FOV may have an extremely bright area including the sun. The overall lighting conditions in the FOV of the second camera may be relatively darker than the FOV of first camera. The vehicle system may compute an optimal exposure time for the two cameras based on the lighting conditions in the FOVs of both cameras. The optimal exposure time may allow the car to have roughly the same exposure in both cameras, and consequently allow the car in the two images to have similar appearance to be recognized as the same car.

Herein, the optimal exposure time may be optimized for the object of interest to be consistently depicted in the images from multiple cameras but the optimal exposure time may not be ideal for the individual overall image of each camera. For the first camera whose FOV includes the sun, in contrast to the individualized automatic exposure which may reduce the exposure time to dim the bright area for keeping the sun being washed out by saturation, the optimal exposure time may actually increase the exposure time to allow the sun to be washed out by saturation but allow the car to have more exposure for a clearer image. For the first camera, the optimal exposure time may be longer than the exposure time proposed by the individualized automatic exposure. For the second camera whose FOV includes a dark area, in contrast to the individualized automatic exposure which may increase the exposure time for keeping the relatively dark area being visible, the optimal exposure time may actually increase or decrease the exposure time to allow the car to have appropriate exposure for a clear image despite of other regions of the image. For the second camera, the image may allow some other objects in relatively dark area to be unclear but may allow the object of interest to have similar image similar with the first camera. In particular embodiments, the optimal exposure time may be determined for two or more cameras having overlapping FOVs in the vehicle system. After the optimal exposure time is calculated, the vehicle system may coordinate, synchronize, and control the multiple cameras having overlapping FOVs to take pictures. As a result, the object of interest in all these pictures may be more consistently depicted. The sensor fusion algorithm may extract useful information about the object of interest from multiple images and construct the 3D model based on the extracted information. The vehicle system may determine the perception, depth, and distance information about object of interest and react accordingly.

In particular embodiments, the vehicle system improves safety for driving in complex lighting conditions by effectively detecting the object of interest under different lighting conditions and reacting accordingly. The vehicle system with cameras using coordinated automatic exposure with optimal exposure time may recognize the object of interest in the overlapping FOVs of multiple cameras from the images of these cameras despite of the different lighting conditions of the FOVs. The vehicle system may determine the optimal exposure time based on multiple cameras and all cameras may collectively contribute to the optimized decision. The cameras may be coordinated using the optimal exposure time to allow the object of interest to have roughly the same exposure time. The optimal exposure time may allow the cameras having the overlapping FOVs to have similar images for the same object. The vehicle system may be more effective for detecting the object of interest and extracting useful information to construct 3D models including depth information. The overall vehicle system improves safety and robustness for driving under complex lighting conditions. Particular embodiment of the system and method of this disclosure may be implemented on or associated with a stand-alone device. Particular embodiments of the system and method of this disclosure may be associated with or applicable to all kinds of vehicles including, for example, but not limited to, an autonomous vehicle, a driver-driven vehicle, a computer-assisted vehicle, a human-computer hybrid driving vehicle, etc.

FIG. 1 illustrates an example high-level schematic of an automotive camera system. In particular embodiments, the system may include a computer 110, one or more camera interface devices 120, a timing system 130, and a number of cameras pairs 140. In particular embodiments, the camera interface device 120 may be a camera interface board (CM). In particular embodiments, the computer 110 may be coupled to the camera interface device 120 through multiple channels including, for example, but not limited to, a gigabit ethernet (1 GigE) control plane channel 150A, a number of 10 gigabit ethernet (10 GigE) data channels 150B, and a number of PCI Express (PCIe) channels 150C. The GigE control plane channel 150A may include the control signals for image compression, i2C control, and image signal processing (ISP) of the camera interface device 120. The 10 GigE data channels 150B may use user datagram protocol (UDP) for communicating with the computer 110 and may have a bandwidth of 10 Gbps. The PCIe channels 150C may have at least 16 channels and may have a bandwidth of 126 Gbps. The timing system 130 may be coupled to the computer 110 through a timestamp link 156 and may be coupled to the camera interface device 120 through a camera synchronizing link 154. The camera interface device 120 may be coupled to the camera pairs through a number of coax serial links 152. In particular embodiments, the coax serial links 152 may transmit power for the associated cameras and a number of signals, for example, mobile industry processor interface (MIPI) signals, synchronizing signals, I2C signals, and signals for image data.

In particular embodiments, the camera pair may be a stereo camera pair including a left camera 140A and a right camera 140B. In particular embodiments, the left and right cameras in a stereo camera pair may have overlapping field of view (FOV). In particular embodiments, two or more cameras from different stereo camera pairs may have overlapping FOVs. In particular embodiments, two or more cameras may be synchronized for timing with a high precision (e.g., less than 10 ns skew) to take pictures for advanced 3D reconstruction. In particular embodiments, the cameras being synchronized may be within the same camera pair or from different camera pairs. In particular embodiments, two or more cameras having the overlapping FOVs may be controlled and coordinated to use an optimal exposure time for taking pictures. In particular embodiments, the cameras may have high dynamic range (HDR) imaging capability. In particular embodiments, some or all of the cameras of the stereo camera pairs 140 may be mounted on the roof of the vehicle. In particular embodiments, some or all cameras of the stereo camera pairs 140 may be mounted on other parts of the vehicle, for example, on the sides of the vehicle or inside the vehicle. In particular embodiments, the camera interface devices 120 may be mounted inside the vehicle. In particular embodiments, the camera interface devices 120 may be mounted outside the vehicle, for example, on the roof of the vehicle.

In particular embodiments, the computer 110 may coordinate with the timing system 130 and the camera interface device 120 to control the camera pairs 140 to take pictures or generate a video stream composed of a series of pictures.

In particular embodiments, the computer 110 may communicate with other sensors for data signals or control signals through other interfaces. In particular embodiments, the timing system 130 may include a time generator generating timing signals for the system. The timing system 130 may send the timing signals to the camera interface device 120 through the camera synchronizing link 154 to synchronize multiple cameras in the camera pairs 140. The timing system may send timestamps to the computer 110 through the timestamp link 156. In particular embodiments, the timing system may communicate with other sensors through other sensor timing interfaces. The camera interface device 120 may receive the video stream from the camera pairs 140. The camera interface device 120 may compress the received video from the camera pairs 140 and send the compressed video to the computer 110 through the channels between the camera interface device 120 and the computer 110. The computer 110 may store the received compressed video in a storage and the stored videos in compressed format may be used for offline training of a machine learning (ML) model associated with the vehicle.

In particular embodiments, the ML model may include a convolutional neural network (CNN) for detecting objects of interest, such as, a car, a human, a bicycle, or a pet. In particular embodiments, the ML model may detect an object of interest in the shared overlapping area of the FOVs of multiple cameras. The vehicle system may communicate with the multiple cameras to gather the lighting conditions information of the FOV of each camera. The vehicle system may identify the different exposure amount for the cameras in the same or different camera pairs. The vehicle system may compute an optimal exposure time based on the lighting conditions in the FOVs of all these cameras. The vehicle system may coordinate and synchronize these cameras to take pictures using the optimal exposure time to allow the object of interest to have roughly the same exposure time in different cameras. The vehicle system may exact useful information from different images and construct the 3D models for the object of interest. In particular embodiments, the system may include a stereo engine for extracting and processing stereo information such as perception, distance, or angle of the detected objects. In particular embodiments, the computer 110 may receive vehicle status data from other parts of the system and send out vehicle control commands to the vehicles. In particular embodiments, the computer 110 may be mounted inside the vehicle.

In particular embodiments, each camera in the stereo camera pairs 140 may include a sensor board and a lens assembly. Each sensor board may include a serializer and an image sensor. In particular embodiments, the image sensor may be an image sensor having HDR capability, 1920 by 1080 pixels resolution, 10 bits per pixel data, and 30 FPS frame rate. In particular embodiments, the image sensor may be a complementary metal oxide semiconductor (CMOS) sensor. In particular embodiments, the image sensor may be a monochrome sensor with RCCC or RCCB array with 4 k resolution (i.e., 4096 pixels by 2160 pixels). The sensor board may be coupled to the serializer through a number of channels, such as, a MIPI channel, a I2C channel, and a synchronizing channel. The cameras may capture a series of images forming a video stream and may send the video stream to the camera interface device 120 through the coax serial links 152. The serializer may convert the image signals into a format suitable to be transmitted through the coax serial links 152.

In particular embodiments, the camera interface device may include an ISP and compression module. In particular embodiments, the ISP and compression module may include an SoC ISP chip. In particular embodiments, the ISP and compression module may include an ISP module and a high efficiency video coding (HEVC, i.e., H.265) codec module. In particular embodiments, the ISP and compression module may be based on field-programmable gate array (FPGA). In particular embodiments, the ISP and compression module may be based on application-specific intergrade circuit (ASIC). The ISP module may process the received raw image for demosaic processing (i.e., debayer processing), color correction, and color space chroma subsampling. In particular embodiments, the raw image may have 4096 pixels by 2160 pixels resolution and each pixel may have 10 bits for digitalized data (i.e., 10 bits per pixel). In particular embodiments, the HEVC codec module 125 may generate the compressed video stream according to the H.265 compression standard. The compressed video may have smaller size than the uncompressed video. As an example and not by way of limitation, the compressed video may have a size which is one tenth to the size of the uncompressed video. In particular embodiments, the HEVC codec module 125 may allow the video content to have a data compression ratio up to 1000:1. In particular embodiments, the compressed video may be sent to the computer to be logged to disk of the computer. Although this disclosure illustrates and describes the camera system that are configured in a particular manner, this disclosure contemplates any suitable camera system for vehicle that are configured in any suitable manner.

Figure 2:
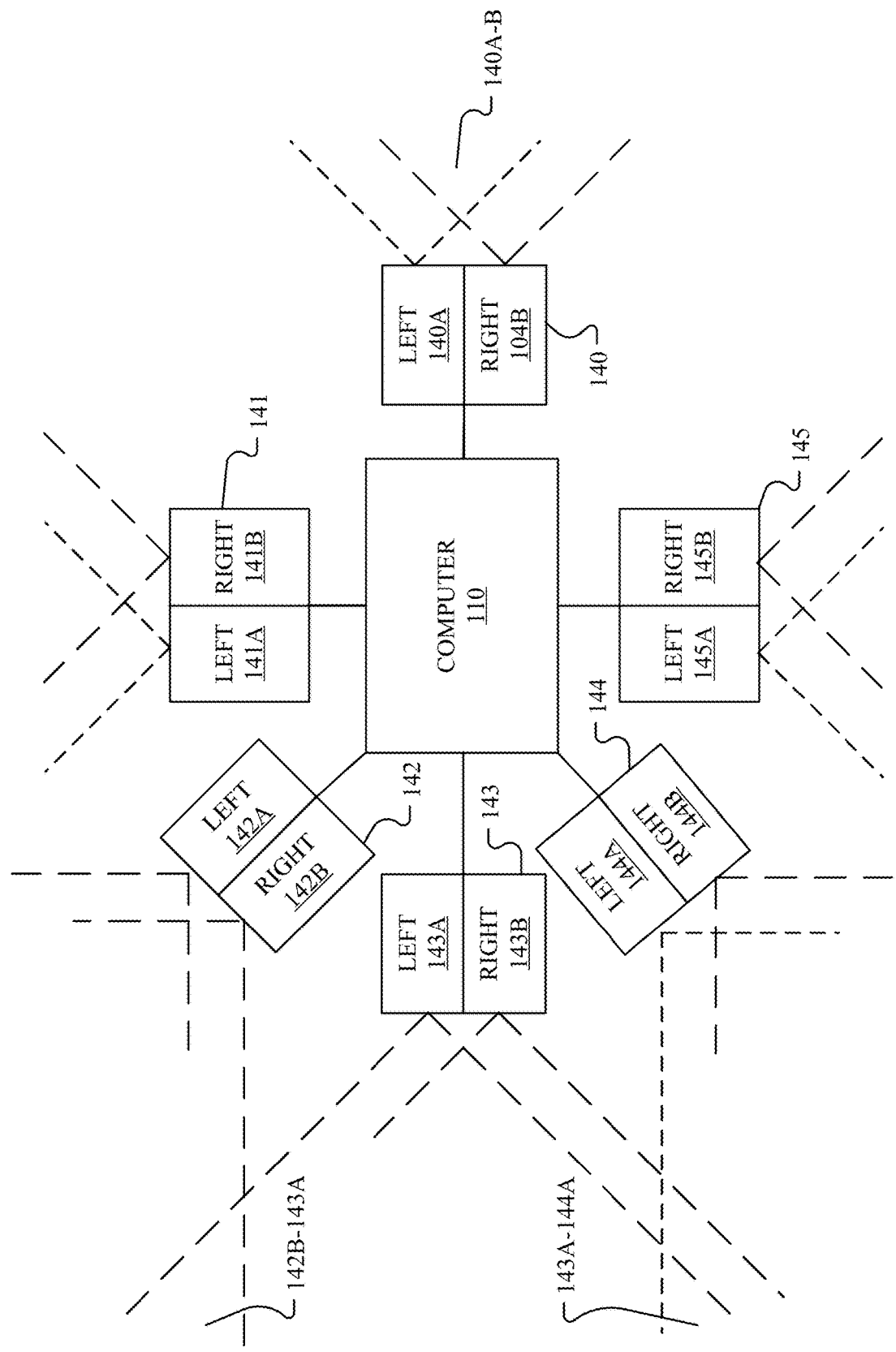
FIG. 2 illustrates an example configuration of the camera system with the stereo camera pairs facing toward different directions of a vehicle.

FIG. 2 illustrates an example configuration of the camera system with the stereo camera pairs facing toward different directions of a vehicle. In particular embodiments, the camera system may include a computer 110 and a number of cameras. In particular embodiments, the cameras of the camera system may be organized as the stereo camera pairs (e.g., 140, 141, 142, 143, 144, 145). In particular embodiments, the camera system may include any number of individual camera or stereo camera pairs. In particular embodiments, the computer 110 may be connected to the cameras through one or more camera interface devices. In particular embodiments, the computer may be directly connected to the cameras. In particular embodiments, the stereo camera pairs may face forward direction (e.g., 140), backward direction (e.g., 143), left direction (e.g. 141), right direction (e.g., 145), or arbitrary directions (e.g., 142, 144) of the AV. In particular embodiments, the cameras may face any suitable directions of the AV.

In particular embodiments, each stereo camera pair (e.g., 140) may include a left camera (e.g., 141A) and a right camera (e.g., 140B). In particular embodiments, the left and right camera within a stereo camera pair may have shared overlapping area in their fields of view (FOVs) (e.g., the area 140A-B) for stereo perception of objects. In particular embodiments, left and right camera of a stereo camera pair may be aligned together and face toward the same direction. In particular embodiments, the left and right camera of a stereo camera pair may face slightly different direction but still have the overlapping FOVs. In particular embodiments, the left and right cameras of a stereo camera pair may be mounted next to each other and face roughly the same direction. In particular embodiments, the left and right cameras of a stereo camera may have a distance to each other and face roughly the same direction.

In particular embodiments, two cameras from the same or different stereo camera pairs may have overlapping FOVs (e.g., the area 142B-143A, the area 143A-144A). In particular embodiments, a first right camera (e.g., 142B) in a first stereo camera pair (e.g., 142) may have overlapping FOV (e.g., the area 142B-143A) with a second right camera (e.g., 143A) in a second stereo camera pair (e.g., 143). In particular embodiments, a first left camera (e.g., 144A) in a first stereo camera pair (e.g., 144) may have overlapping FOV (e.g., the area 142A-144A) with a second left camera (e.g., 143A) from another stereo camera pairs (e.g., 143). In particular embodiments, the camera system may have multiple cameras having overlapping FOVs and the cameras may be from the same stereo camera pair or different stereo camera pairs. In particular embodiments, the camera system may have a number of camera groups and the cameras in each group may have overlapping FOVs. In particular embodiments, a camera may belong to multiple camera groups including cameras having overlapping FOVs. In particular embodiments, the shared FOV area by multiple cameras may have different view angles. For example, the overlapping FOV area 140A-B shared by the cameras 140A and 140B may have larger view angle than the overlapping FOV area 142B-143A shared by the cameras 142B and 143A. In particular embodiments, the cameras of the camera system may have the FOVs collectively covering all the directions of 360 degree panoramic view surrounding of the AV. In particular embodiments, each camera may have the FOV overlapping with the FOV of its neighbor cameras. In particular embodiments, multiple cameras amounted separately from each other may have the overlapping FOVs. Although this disclosure illustrates and describes the camera system that are configured in a particular manner, this disclosure contemplates any suitable camera system for vehicle that are configured in any suitable manner.

Figure 3:
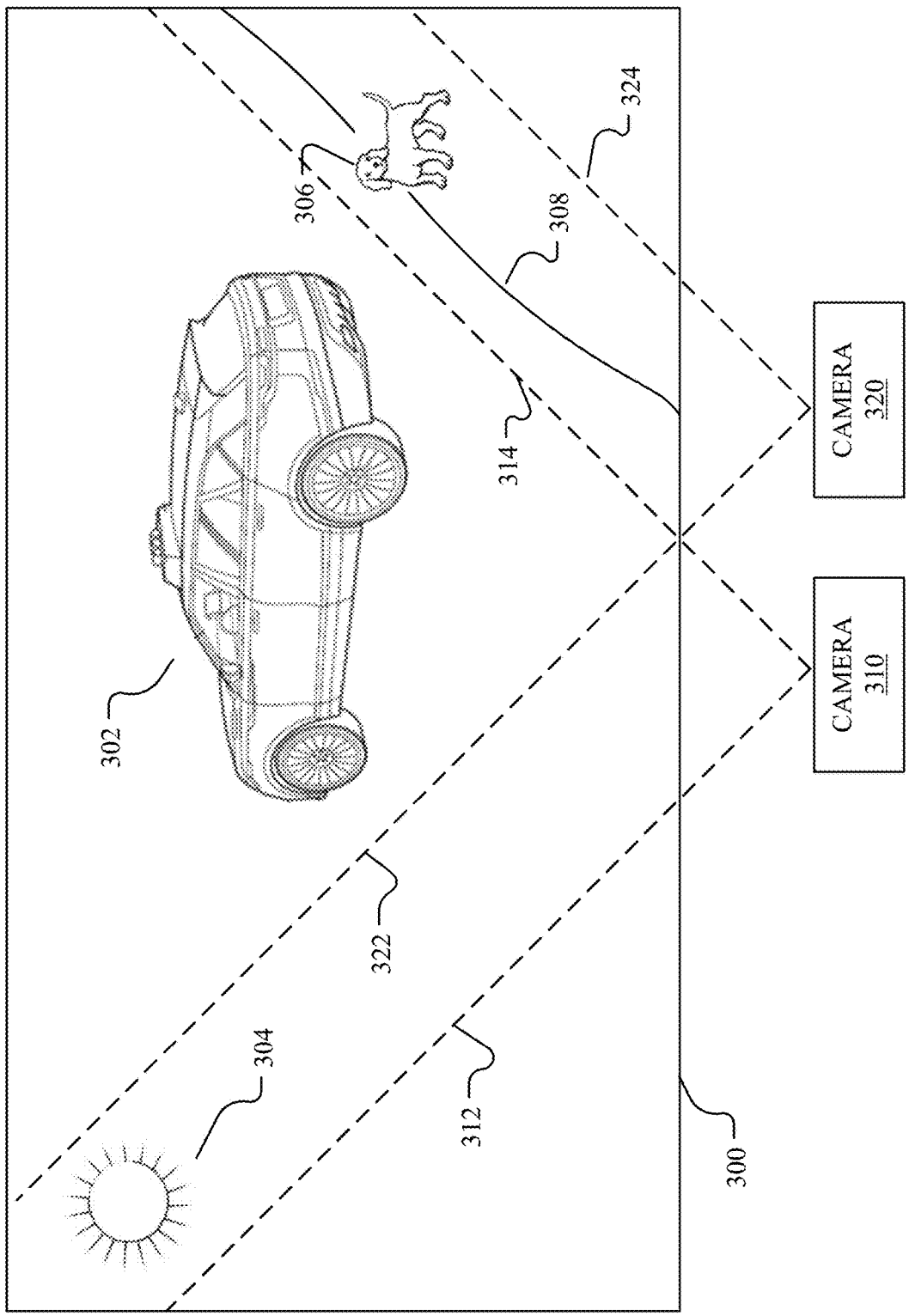
FIG. 3 illustrates a partially-overlapping scene within the shared overlapping field of view (FOV) of two cameras.

FIG. 3 illustrates a partially-overlapping scene within the shared overlapping field of view (FOV) of two cameras. In particular embodiments, the scene 300 may include a number of objects, for example, a car 302, the sun 304, a pet 306, a curb 308. In particular embodiments, the FOVs of the camera 310 and 320 may be overlapping and each FOV may cover a portion of the scene 300. In particular embodiments, the FOV of the camera 310 may have a first edge line 312 and a second edge line 314 and the FOV of the camera 310 may include the area between the two edge lines 312 and 314. In particular embodiments, the FOV of the camera 320 may have a first edge line 322 and a second edge line 324 and the FOV of the camera 320 may include the area between the two edge lines 322 and 324. In particular embodiments, the FOV of the camera 310 may include the sun 304 and the car 302 but may not include the pet 306 and the curb 308. In particular embodiments, the FOV of the camera 320 may include the car 302, the pet 306, and the curb 308 but may not include the sun 304. In particular embodiments, the car 302 may be within the shared overlapping area of the FOVs of the camera 310 and the camera 320. The FOVs of the cameras 310 and 320 are for exemplary purpose only and the FOVs of the cameras are not limited thereof. The FOVs in particular embodiments may have any suitable size of FOVs with any suitable view angles. The objects illustrated in FIG. 3 are not drawn to scale and are for exemplary purpose only. The scenes of the cameras are not limited thereof, and, in particular embodiments, the scenes may include any number of other objects. The arrangement of the objects in FIG. 3 are for exemplary purpose only and are not limited thereof. The arrangements of the objects in particular embodiments may include any suitable arrangements. Although this disclosure illustrates and describes the camera system that are configured in a particular manner, this disclosure contemplates any suitable camera system for vehicle that are configured in any suitable manner.

Figure 4B:
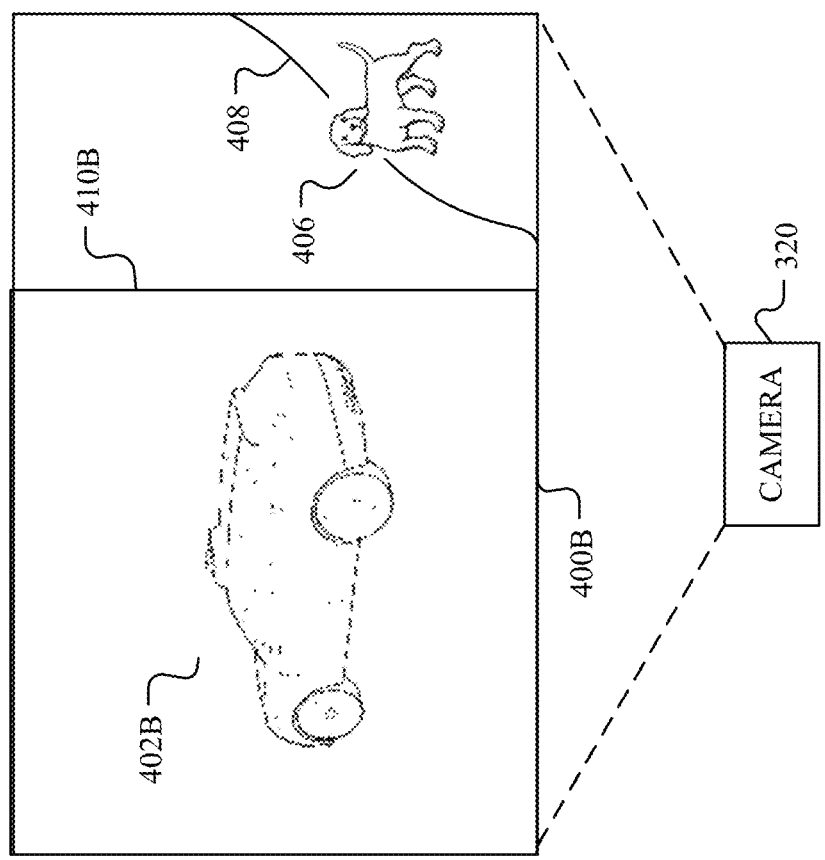
FIG. 4B illustrates an example picture of the scene shown in FIG. 3B, which has dimmer lighting conditions, taken by a second camera using individualized auto-exposure.
Figure 4A:
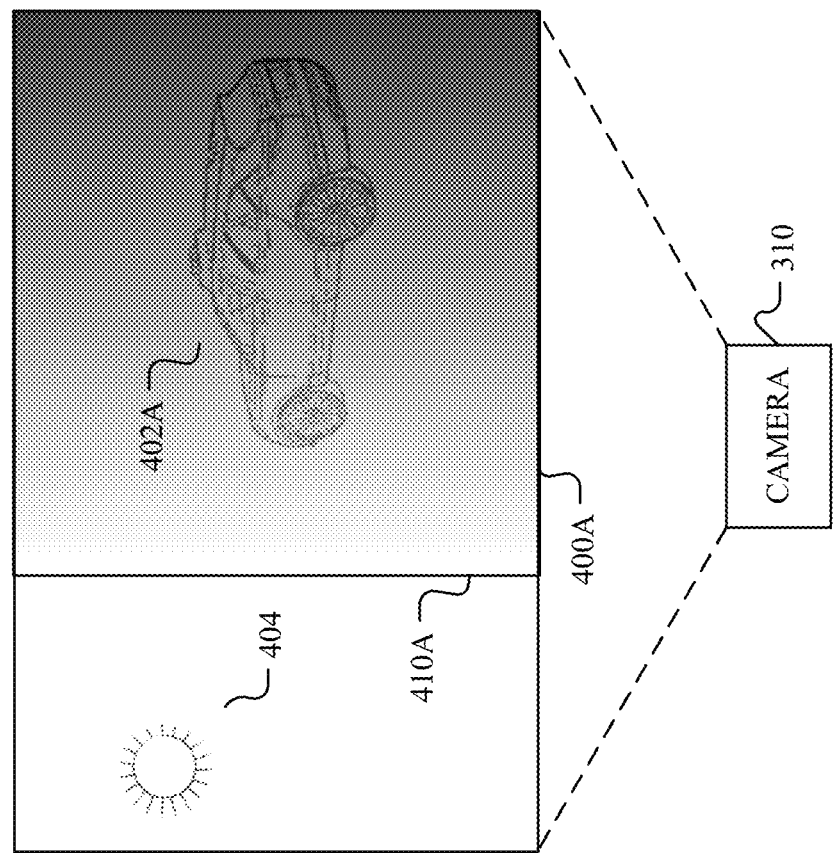
FIG. 4A illustrates an example picture of the scene shown in FIG. 3, which has bright lighting conditions, taken by a first camera using individualized auto-exposure.

FIG. 4A illustrates an example picture of the scene shown in FIG. 3, which has bright lighting conditions, taken by a first camera using individualized auto-exposure. As illustrated in FIG. 3, the FOV of the camera 310 may include the car 302 and the sun 304, and consequently, the FOV of the camera 310 may be very bright. The individualized auto-exposure may adopt a short exposure time for camera 310 to dim the bright area in the image to keep the sun being washed out by saturation. The short exposure time for camera 310 may dim the bright area in the image to avoid extreme brightness but may cause the non-bright area 410A to be under-exposure. The resulting image 400A may have a sun image 404 being dimmer than the actual sun but clearly visible and the brightness of the image 400A may change in gradient from the bright side including the sun to the dark side including the car. The car image 402A in the area 410A of the image 400A may be very dark or even invisible because of the short exposure time of the camera 310.

FIG. 4B illustrates an example picture of the scene shown in FIG. 3, which has dimmer lighting conditions, taken by a second camera using individualized auto-exposure. As illustrated in FIG. 3, the FOV of the camera 320 may include the car 302, the pet 306, and the curb 308. The FOV of the camera 320 may not include the sun, and consequently, the FOV of camera 320 may be relatively dark. In some cases, the individualized auto-exposure may determine the exposure time for the camera 320 to have clear image for the overall FOV according to the overall lighting conditions in the FOV. In some other cases, the area including the pet 306 and the curb 308 may be extremely dark and the individualized auto-exposure may increase the exposure time for the camera 320 to keep the objects in the dark being visible. The resulting image 400B may have visible images for the pet 406 and the curb 408 but have unclear car image 402B. The resulting image 400B may have the car image 402B being washed out because of the over-exposure caused by the long exposure time for the camera 320.

The vehicle system may compare the images 400A and 400B for detecting the car in the images. The areas 410A and 410B may be corresponding to the shared overlapping area of the FOVs for the cameras 310 and 320. The area 410A of the image 400A may include the car image 402A and the area 410B of the image 400B may include the car image 402B. The car images 402A and 402B may be corresponding to the same car 302 as shown in FIG. 3. However, as discussed above, the car image 402A may be very dark because of the short exposure time of the camera 310 and the car image 402B may be very bright because of the long exposure time of camera 320. Therefore, the car images 402A and 402B of the same car 302 may appear to be very different because of the personalized auto-exposure of the camera 310 and 320. Although the car image information may not be totally lost in the images because of the HRD capability of the cameras, the dissimilarity may be great enough to prevent the algorithm from recognizing the car from the images. Consequently, the difference of the car images of different cameras may have negative impact on the vehicle system for driving in complex lighting conditions.

In order to solve this problem, particular embodiments of the vehicle system may determine an optimal exposure time for multiple cameras having overlapping FOVs based on the lighting conditions of all these cameras. In particular embodiments, the vehicle system may have a number of cameras having overlapping FOVs. In particular embodiments, the vehicle system may identify the cameras having the overlapping FOVs. In particular embodiment, the vehicle system may communicate with the multiple cameras to determine and gather the lighting conditions in the overlapping FOV area of these cameras. In particular embodiments, the vehicle system may compute the optimal exposure time for these cameras collectively based on the lighting conditions in the FOVs of all these cameras. The multiple cameras may jointly contribute to the optimized decision for the exposure time. The vehicle system may coordinate the multiple cameras using the optimal exposure time to take pictures.

In particular embodiments, the vehicle system may determine the optimal exposure time based on a target region in the shared overlapping area of the FOVs of these cameras. In particular embodiments, the optimal exposure time may allow the target region in the overlapping area of the FOVs of these cameras to have to recognizable images in all pictures of these cameras. In particular embodiments, using the optimal exposure time, the cameras may capture images for the target region in the shared overlapping area of the FOVs of these cameras to have similar brightness or recognizable images despite that the images are captured by different cameras under different lighting conditions.

In particular embodiments, the target region may include the whole shared overlapping area of the FOVs of these cameras. In particular embodiments, the vehicle system may determine the optimal exposure time based on the whole shared overlapping area of the FOVs of these cameras. In particular embodiments, using the optimal exposure time, the cameras may capture images for the whole shared overlapping area of the FOVs of these cameras to have similar brightness or recognizable images even though the images are captured by different cameras under different lighting conditions.

In particular embodiments, the target region may include a sub-region of the shared overlapping area of the FOVs of these cameras. In particular embodiments, the vehicle system may determine the optimal exposure time based on the sub-region of the overlapping area of the FOVs of these cameras. In particular embodiments, using the optimal exposure time, the cameras may capture images for the sub-region of the overlapping area of the FOVs of these cameras to have similar brightness or recognizable images even though the images are captured by different cameras under different lighting conditions.

In particular embodiments, the target region may include an object of interest in the shared overlapping area of the FOVs of these cameras. In particular embodiments, the vehicle system may include a smart edge processor for determining the target region including the object of interest. In particular embodiments, the vehicle system may use a CNN as the object detector to detect the object of interest within the target region. In particular embodiments, the vehicle system may determine the optimal exposure time based on the object of interest in the shared overlapping area of the FOVs of these cameras. In particular embodiments, using the optimal exposure time, the cameras may capture images for the object of interest in the overlapping area of the FOVs of these cameras to have similar brightness or recognizable images despite that the images are captured by different cameras under different lighting conditions.

In particular embodiments, the target region may include multiple objects of interest in the shared overlapping area of the FOVs of these cameras. In particular embodiments, the vehicle system may determine a priority for each object of interest in the shared overlapping area of the FOVs of these cameras. In particular embodiments, the vehicle system may determine the optimal exposure time based on the object of interest with the highest priority in the shared overlapping area of the FOVs of these cameras. In particular embodiments, using the optimal exposure time, the cameras may capture images for the object of interest with highest priority in the overlapping area of the FOVs of these cameras to have similar brightness or recognizable images despite that the images are captured by different cameras under different lighting conditions.

In particular embodiments, a machine learning (ML) model may detect the objects of interest in the shared overlapping area of the FOVs of the multiple cameras. In particular embodiments, the camera system may minimize differences in appearance of the objects of interest in different pictures using the optimal exposure time. In particular embodiments, a sensor fusion algorithm may detect correlation of multiple images including the objects of interest and construct 3D models based on the multiple images of these cameras. In particular embodiments, the vehicle system may determine the object of interest position (e.g., distance and angle with respect to the AV) using the object of interest offset information in multiple images and the locations of the cameras. In particular embodiments, the vehicle system may make decisions based on the 3D model and in response to the surrounding environment to guide the vehicle safely.

In particular embodiments, the vehicle system may allow a camera to have unideal images for other regions beyond the target region in the FOV of the camera. In particular embodiments, the other regions in the FOV of a camera beyond the target region may be very bright because of over-exposure caused by long exposure time but may be still visible. In particular embodiments, the other regions in the FOV of a camera beyond the target region may be essentially washed out by saturation and the objects in the non-target regions may be not visible. In particular embodiments, the other regions in the FOV of a camera beyond the target region may be very dark because of under-exposure caused by short exposure time but may be still visible. In particular embodiments, the other regions in the FOV of a camera beyond the target region may be extremely dark because of under-exposure caused by short exposure time and the objects in the non-target regions may be not visible.

In particular embodiments, the coordinated auto-exposure may determine the exposure time for multiple cameras based on the lighting condition in a target region in the FOV of each camera. In particular embodiments, a computing system of the vehicle system may determine a first target region in a first FOV of a first camera and a second target region in a second field of view of a second camera. In particular embodiments, the first FOV of the first camera and the second FOV of the second camera may be partially overlapping. In particular embodiments, the first target region and the second target region may be the whole FOV region of the first camera and the second camera, respectively. In particular embodiments, the first target region and the second target region may be a sub-region of the FOV of the first camera and the second camera, respectively. In particular embodiments, the first target region and the second target region may be the overlapping FOV region of the first camera and the second camera. In particular embodiments, the first region and the second region may cover different areas and may be partially overlapping. In particular embodiments, the first target region and the second target region may have an overlapping area which includes one or more objects of interest.

In particular embodiments, the computing system may determine the lighting conditions of the first target region and the second target region using the first camera and the second camera, respectively. In particular embodiments, the computing system may determine an optimal exposure time for at least the first cameras and the second camera based at least in part on the determined lighting conditions. In particular embodiments, the computing system may instruct the first camera and the second camera to take pictures using the determined optimal exposure time. In particular embodiments, the computing system may determine the optimal exposure time for two or more cameras having shared overlapping FOVs and coordinate the two or more cameras to take pictures.

Figure 5B:
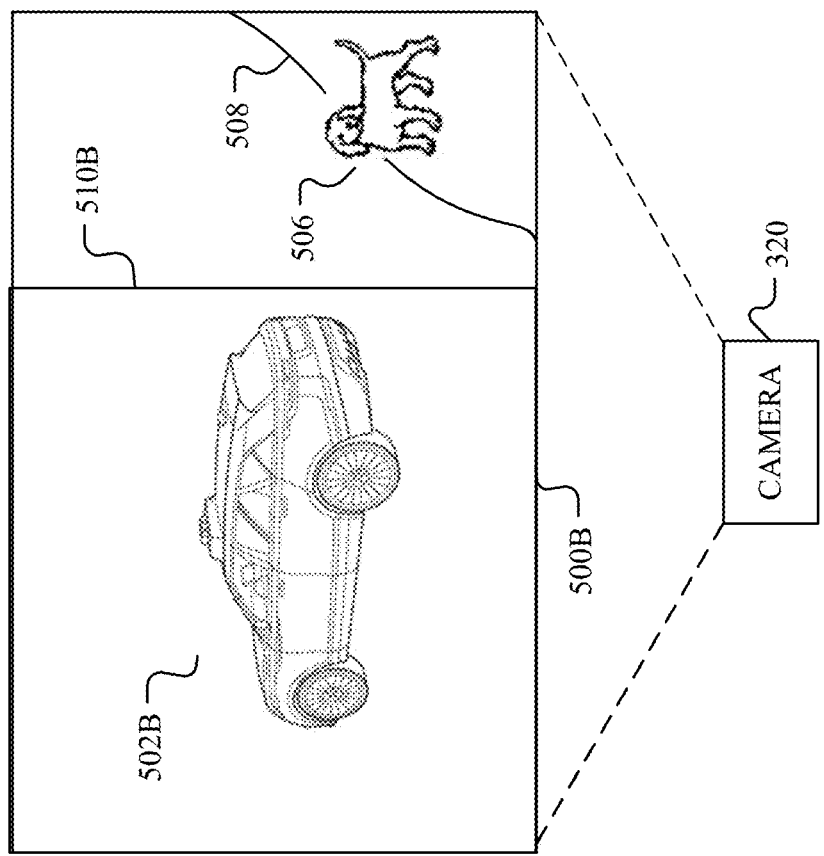
FIGS. 5A-5B illustrate example pictures of the scenes shown in FIG. 3, respectively, taken by two cameras using coordinated auto-exposure.
Figure 5A:
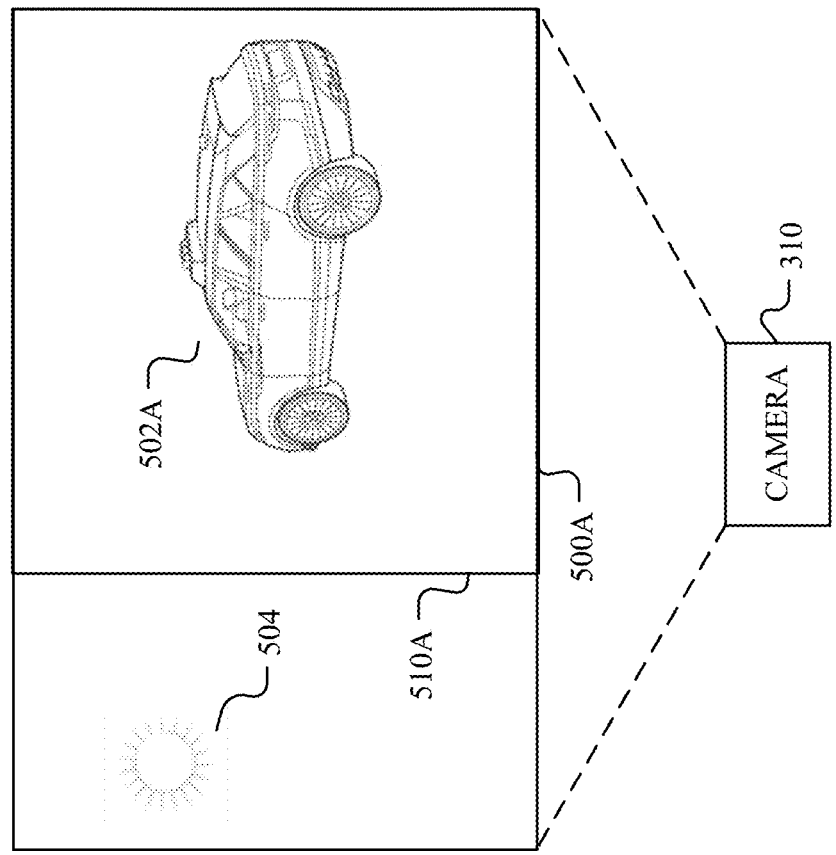

FIGS. 5A-5B illustrate example pictures of the scenes shown in FIG. 3, respectively, taken by two cameras using coordinated auto-exposure. In particular embodiments, the vehicle system may identify the cameras 310 and 320 having the shared overlapping area in the FOVs of the two cameras. In particular embodiments, the vehicle system may communicate with the cameras 310 and 320 to determine the lighting conditions in the FOVs of the two cameras. The vehicle system may identify that the FOV of the camera 310 may include the sun 304 and the car 302 (as illustrated in FIG. 3O) and the overall FOV of the camera 310 may be very bright. The vehicle system may identify that the FOV of the camera 320 may include the car 302, the pet 306, and the cub 308 excluding the sun 302 and the overall FOV of the camera 310 may be relatively dark.

Rather than using the individualized auto-exposure to allow each camera to determine its exposure time, the vehicle system may determine an optimal exposure time for both of the cameras 310 and 320. The optimal exposure time may allow the car image 502, which is corresponding to the object of interest, to have the roughly the same exposure time in both images of the two cameras. For example, for the camera 310, the vehicle system may increase the exposure time (comparing to the individualized auto-exposure) to allow the region having the sun image 504 to be over-exposed but to allow the region with the car image 502 to have appropriate exposure time. For the camera 320, the vehicle system may increase or decrease the exposure time (comparing to the individualized auto-exposure) to allow the car image 502 to have appropriate exposure time. The vehicle system may determine the optimal exposure time based on the image exposure of both cameras to minimize the difference for the appearance of the car in two images. In particular embodiments, the vehicle system may determine a weighted average exposure time as the optimal exposure time for the two cameras of 310 and 320. In particular embodiments, the vehicle system may coordinate the two cameras 310 an 320 to take pictures using the optimal exposure time. As results, the car may appear to be similar in both images of 500A and 500B and the car images 502A and 502B may have similar brightness being recognizable by the sensor fusion algorithm. The vehicle system may use the sensor fusion algorithm to detect the correlation of the two images and extract the useful information about the car from the images. In particular embodiments, the sensor fusion algorithm may construct 3D models for the objects of interest and determine the perception and distance information of the object from the images.

Herein, the optimal exposure time may be optimized for keeping the object of interest to have the same or similar appearance and brightness in different images taken by different cameras. However, the optimal exposure time may not be ideal for each image as an individual image. In particular embodiments, the image 500A taken by the camera 310 may have the sun image 504 being very bright because of the long exposure time. In particular embodiments, the image 500A taken by the camera 310 may have the sun image 504 being essential washed out by the over-exposure caused by the long exposure time and the sun image 504 may not be visually recognizable. In particular embodiments, the image 500B taken by the camera 320 may have the pet image 506 and the curb image 508 in a very dark area because of the relatively short exposure time. In particular embodiments, the image 500B taken by the camera 320 may have the pet image 506 and the curb image 508 in a very dark area being not visually recognizable. In particular embodiments, the vehicle system may use the coordinated auto-exposure to coordinate the multiple cameras having overlapping FOVs to have recognizable similar images for the target region or the object of interest at the cost that other regions or objects may not be ideal in the images. Although this disclosure illustrates and describes the cameras with coordinated auto-exposure that are configured in a particular manner, this disclosure contemplates any cameras with coordinated auto-exposure for vehicle that are configured in any suitable manner.

Figure 6:
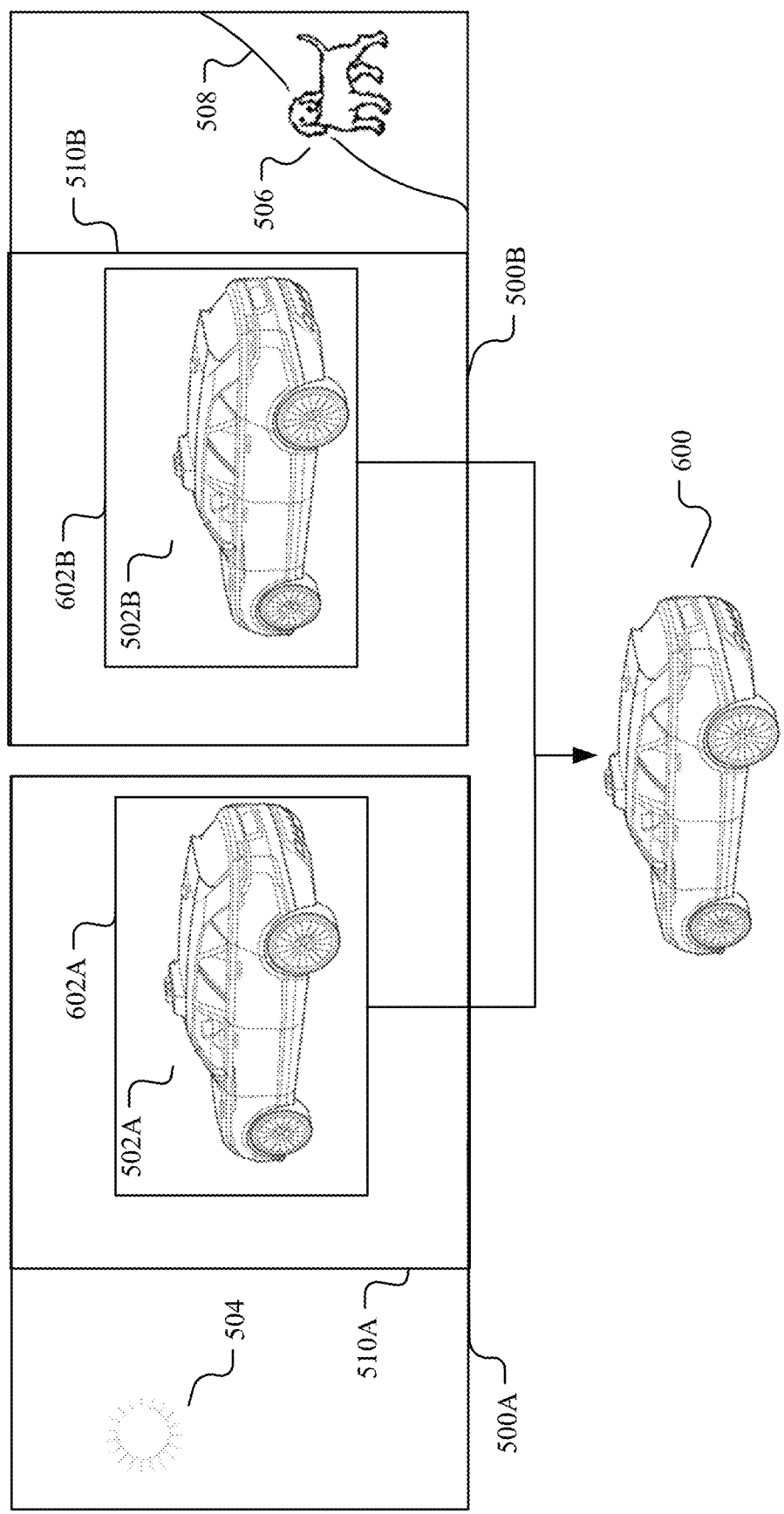
FIG. 6 illustrates an example detected object of interest within the scene shown in FIG. 3.

FIG. 6 illustrates an example detected object of interest within the scene shown in FIG. 3. In particular embodiments, the vehicle system may use the ML model to detect the objects of interest. In particular embodiments, operations of the ML model may executed on one or more GPUs and/or CPUs in the computer of the vehicle system. In particular embodiments, the ML model may be stored in a cloud and the computer of the vehicle system may access the ML model through a network connection to the cloud. In particular embodiments, the ML model may be a convolutional neural network (CNN). In particular embodiments, the CNN may be people detector for detecting people or object detector for detecting objects of interest (i.e., objects of interest). In particular embodiments, the object of interest or the object of interest may include, for example, but are not limited to a vehicle, a pedestrian, a bicycle, a pet, a traffic light, a road, a road divider, a street sign, a marking line, a curb, a debris, a building, an intersection, a police officer, or any other objects of interest. In particular embodiments, the object of interest may be identified from the plurality of objects of interest based on a priority factor associated with each of the plurality of objects of interest.

As an example and not by way of limitation, the ML model may detect the car 302 in the shared overlapping area of the FOVs of the two cameras 310 and 320, as illustrated in FIG. 3. The vehicle system may determine an optimal exposure time for the two cameras to allow the car to have roughly the same exposure time in both cameras. The vehicle system may coordinate the cameras 310 and 320 to take pictures on the scenes illustrated in FIG. 3. Both cameras of 310 and 320 may be synchronized to use the optimal exposure time to allow the car to have roughly the same exposure time in both cameras. The images 500A and 500B may be taken by the cameras 310 and 320, respectively, using the optimal exposure time. The first car image 502A and the second car image 502B may be recognizably similar to each other. The ML model may detect the first car image 502A in the image 500A and may detect the second car image 502B in the second image 500B. The computer of the vehicle system may draw a first box 602A around the first car image 502A and a second box 602B around the second car image 502B. The boxes 602A and 602B may be the indicators of the detected car images of 502A and 502B, respectively. The sensor fusion algorithm may detect the correlation between the two images of 500A and 500B and recognize that the region 510A in the image 500A and the region 510B in the image 500B are from the same scene in the overlapping area of the FOVs of the two cameras. The sensor fusion algorithm may recognize that the car image 502A and 502B correspond to the same car 302. The sensor fusion algorithm may extract the perception information from the car images 502A and 502B and construct the 3D model 600 for the car. The vehicle system may make decisions and react accordingly based on the sensor fusion result and in response to the surrounding environment to guide and navigate the AV safely.

In particular embodiments, the ML model may detect multiple objects of interest in the same image. In particular embodiments, the vehicle system may determine a priority for each detected object of interest in the same image and may use the object with highest priority for coordinating cameras and making decisions. As an example and not by way of limitation, the ML model may detect both of the car 502B and the pet 506 from the image 500B. The vehicle system may determine that the car has higher priority because the car is within the same traffic with the AV and the pet 506 is within a sidewalk area separated by the curb 508. The vehicle system may use the car 502B as the object of interest to make decisions. In particular embodiments, the ML model may detect multiple objects of interest in the shared overlapping area of the FOVs of multiple cameras. The vehicle system may determine a priority number for each detected object of interest in the shared overlapping area of the FOVs of the multiple cameras and may use the object with highest priority number for coordinating cameras and making decisions. Although this disclosure illustrates and describes the cameras with coordinated auto-exposure that are configured in a particular manner, this disclosure contemplates any cameras with coordinated auto-exposure for vehicle that are configured in any suitable manner.

Figure 7:
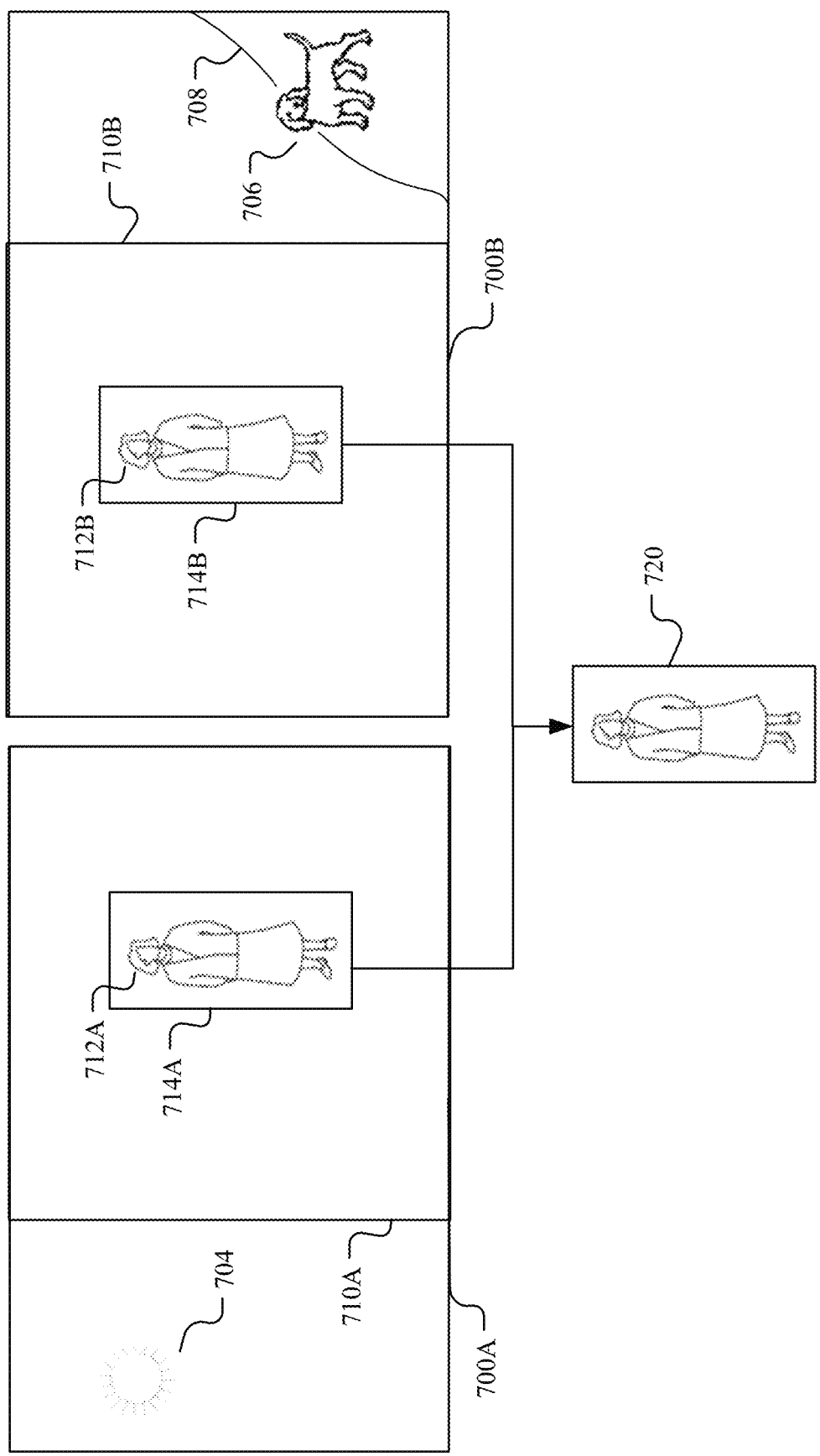
FIG. 7 illustrates an example detected person of interest in a similar scene to the scene shown in FIG. 3.

FIG. 7 illustrates an example detected person of interest in a similar scene to the scene shown in FIG. 3. In particular embodiments, the vehicle system may identify a number of cameras having overlapping FOVs. The cameras having overlapping FOVs may include two or more cameras of the vehicle system. The cameras having overlapping FOVs may belong to the same or different stereo camera pairs. In particular embodiments, the vehicle system may identify a target region within the FOVs of all the identified cameras. In particular embodiments, the vehicle system may communicate with each camera to determine the lighting conditions in the FOV of each camera and the lighting conditions in the target region in the FOV of each camera. In particular embodiments, the vehicle system may use the ML model to detect one or more objects of interest in the target region within the FOVs of the cameras. In particular embodiments, the ML model may be a convolutional neural network (CNN) hosted by one or more GPUs of the computer of the vehicle system. In particular embodiments, the detected object of interest may be a pedestrian.

As an example and not by way of limitation, the cameras 310 and 320 may have a scene including the sun, a pedestrian, a curb, and a pet, similar to the scene shown in FIG. 3, except that the car is replaced by the pedestrian. The pedestrian may be within the shared overlapping area of the FOVs of the two cameras 310 and 320. The vehicle system may detect the pedestrian in the scene and may determine that the pedestrian is the object of interest. In particular embodiments, the vehicle system may determine the shared scene (e.g. 710A, 710B) in the FOVs of the two cameras as the target region for coordinated auto-exposure. In particular embodiments, the vehicle system may detect multiple objects of interest in the target region and may choose the object of interest with highest priority. In particular embodiments, the vehicle system may calculate the optimal exposure time for the cameras 310 and 320 to allow the target region to have roughly the same exposure. In particular embodiments, the optimal exposure time may allow the target region including the object of interest to minimize the difference in the images taken by the two cameras. In particular embodiments, the vehicle system may coordinate the cameras 310 and 320 to take pictures using the optimal exposure time.

The images 700A and 700B may be images taken by the cameras 310 and 320, respectively, using the coordinate auto-exposure. In particular embodiments, the image 700A may have very bright sun image 704 because of saturation. In particular embodiments, the image 700B may have a very dark region including the pet image 706 and the curb image 708 because of under-exposure. In particular embodiments, the images 700A and 700B may have appropriate exposure for the target regions 710A and 710B. In particular embodiments, the target regions 710A and 710B in the images of 700A and 700B may be over-exposed or under-exposed but the two target regions 710A and 710B may have similar brightness and recognizable similar images. In particular embodiments, the object of interest images (e.g., the pedestrian images 712A, 712B) in the two images may have similar visual appearance to allow the recognition by the algorithm. In particular embodiments, the ML model may detect the pedestrian from the image 700A and may draw a box 714A around the pedestrian image 712A. The ML model may detect the pedestrian from the image 700B and may draw a box 714B around the pedestrian image 712B. The boxes 714A and 714B may be the indicators for the detected object of interest. In particular embodiments, the sensor fusion algorithm may detect the correlation between the two images of 700A and 700B. The sensor fusion algorithm may extract useful information about the pedestrian from the two images 700A and 700B to construct the 3D model 720 for the pedestrian. In particular embodiments, the vehicle system may make decision based on the constructed 3D model and in response to the surrounding environment to guide the AV safely. Although this disclosure illustrates and describes the vehicle system with cameras using coordinated auto-exposure that are configured in a particular manner, this disclosure contemplates any vehicle system with cameras using coordinated auto-exposure for vehicle that are configured in any suitable manner.

Figure 8:
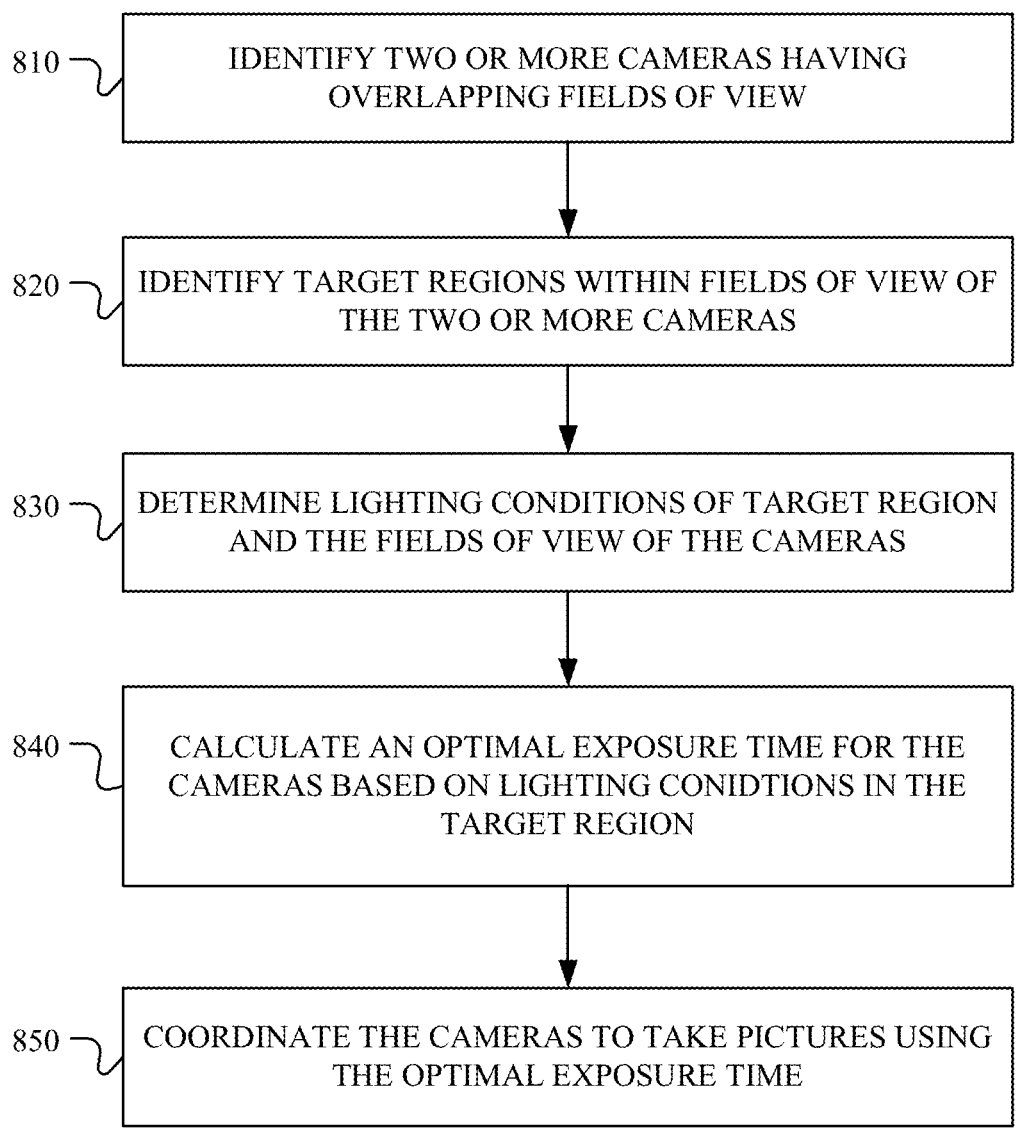
FIG. 8 illustrate an examples method for determining an optimal exposure time for multiple cameras having shared field of view and coordinating the cameras with the optimal exposure time.

FIG. 8 illustrate an examples method for determining an optimal exposure time for multiple cameras having shared field of view and coordinating the cameras with the optimal exposure time. In step 810, the computer of the vehicle system may identify two or more cameras having shared overlapping FOV. The cameras having overlapping FOVs may have at least one FOV region which is shared by all FOVs of these cameras. In particular embodiments, the cameras having shared FOV may belong to the same stereo camera pair or stereo camera group. In particular embodiments, the cameras having shared FOV may belong to different stereo camera pairs or stereo camera groups. In step 820, the computer of the vehicle system may identify a first target region within a first field of view of a first camera and a second target region within a second field of view of a second camera. The first field of view and the second field of view may be partially overlapping. The first target region and the second target region may cover at least one portion of the overlapping area of the first and second fields of view. In particular embodiments, the first and second target regions may correspond to the shared FOV region of the all FOVs of the cameras. In particular embodiments, the first and second target regions may correspond to a sub-region of the shared FOV region by all FOVs of the cameras. In particular embodiments, the first and second target regions may be associated with an object of interest within the shared FOV region by all FOVs of the cameras. In particular embodiments, the vehicle system may detect the object of interest in the scene and identify the first and second target regions based on the region around the object of interest (e.g., a bounding box). In particular embodiments, the vehicle system may detect the object of interest of interest using the ML model such as a convolutional neural network (CNN) executed on one or more GPUs and/or CPUs of the computer. In particular embodiments, the system may determine In step 830, the computer of the vehicle system may determine the lighting conditions in the target region in the FOV of each camera and the lighting conditions in the remain regions beyond the target region in the FOV of each camera. In particular embodiments, the computer may control each camera to meter the lighting conditions in the FOV of that camera including the target region and non-target regions. In particular embodiments, the computer may determine the lighting condition of the object of interest and the overall FOV of each camera including areas covering other objects than the object of interest.

In step 840, the computer of the vehicle system may determine an optimal exposure time for the cameras based on the lighting conditions in the first and second target regions. In particular embodiments, the computer may use the lighting conditions in remaining regions in the FOVs of each camera beyond the corresponding target region to calculate the optimal exposure time. The optimal exposure time may be determined in a way that all related cameras (e.g., those with overlapping FOVs) may jointly contribute to the decision. In particular embodiments, the optimal exposure time may allow the target region to have roughly the same exposure time and the same or similar resulting images for different cameras. In particular embodiments, the optimal exposure time may allow the remaining region in the FOV beyond the target region to be washed out by saturation or to be very dark. In particular embodiments, the optimal exposure time may allow the target region to have unideal images (e.g., too bright or dark) but the unideal images from different cameras may have similar or substantially the same brightness and appearance to allow a same object of interest in the images to be recognized by an object recognition algorithm as the same object of interest. In particular embodiments, the optimal exposure time may allow the first and second target regions including an object of interest in the captured by different images of different cameras to have recognizable similarity or correspondence to be recognized by the algorithm as the same object.

In step 850, the computer of the vehicle system may coordinate the cameras to take pictures of the target region and other regions in the FOVs of the cameras using the optimal exposure time. The cameras may be synchronized to take the pictures at the same time. The target region or the object of interest may have similar or substantially the same brightness and similar or substantially the same appearance in the images of different cameras despite the difference of the lighting conditions in the FOVs of the cameras. In particular embodiments, the vehicle system may use the sensor fusion to detect the correlation of the images and calculate the depth or distance information. In particular embodiments, the system may construct the 3D model for the target region or the object of interest based on the stereo information extracted from the images. In particular embodiments, the vehicle system may make decision (e.g., navigation decisions) based on the depth information, distance information, stereo information, or constructed 3D model to guide the vehicle safely.

Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for determining the optimal exposure time and coordinating cameras using the optimal exposure time including the particular steps of the method of FIG. 8, this disclosure contemplates any suitable method for determining the optimal exposure time and coordinating cameras using the optimal exposure time including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
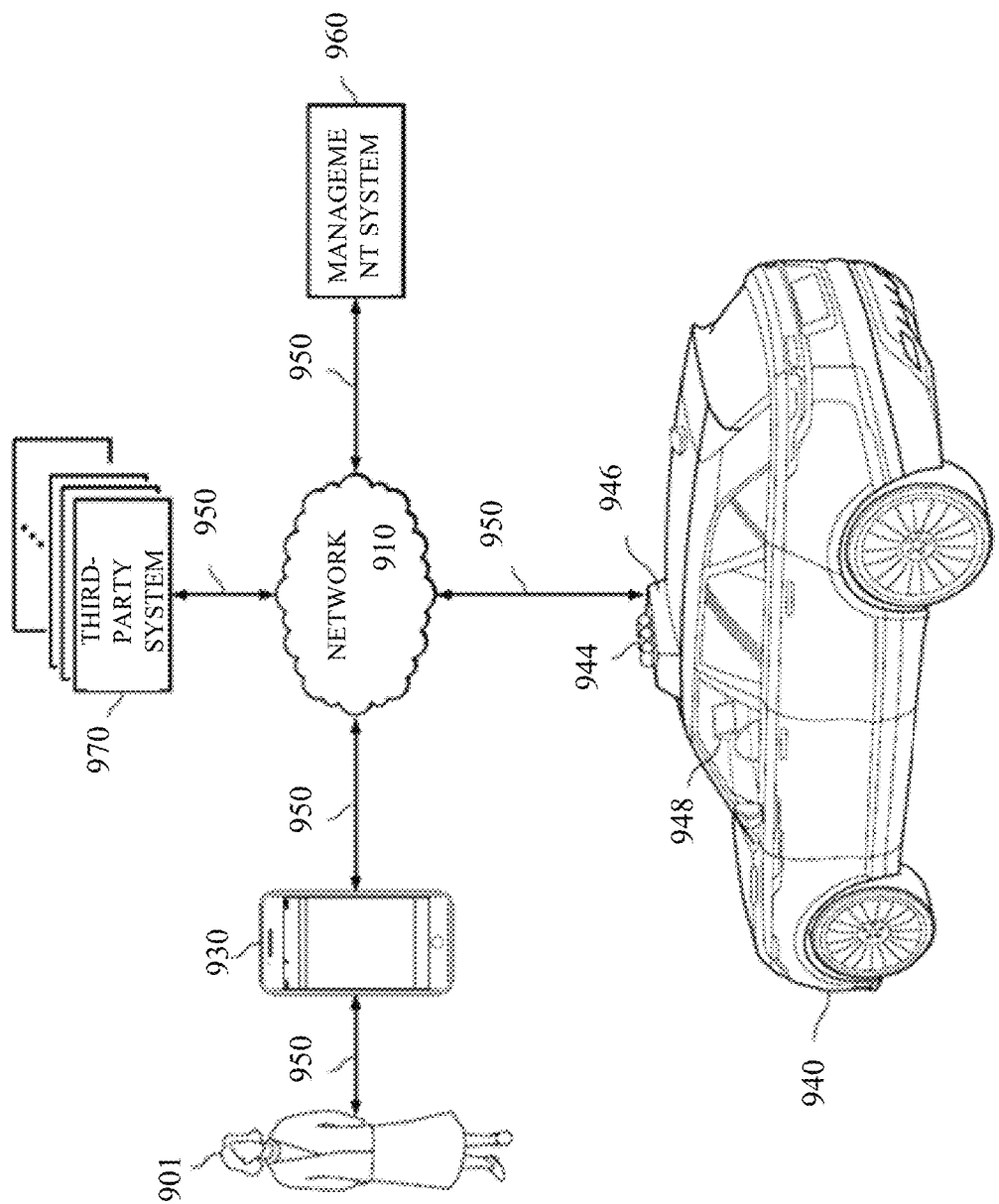
FIG. 9. illustrates an example block diagram of a transportation management environment.

FIG. 9 illustrates an example block diagram of a transportation management environment for matching ride requestors with autonomous vehicles. In particular embodiments, the environment may include various computing entities, such as a user computing device 930 of a user 901 (e.g., a ride provider or requestor), a transportation management system 960, an autonomous vehicle 940, and one or more third-party system 970. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, autonomous-vehicles 940, third-party systems 970, and networks 910.

The user device 930, transportation management system 960, autonomous vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network that is accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, autonomous vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the autonomous vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with the requestor's 901 privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, Calif., the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in the data store.

In particular embodiments, transportation management system 960 may include an authorization server (or any other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computer that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, user device 930 may be a mobile computing device such as a smartphone, tablet computer, or laptop computer. User device 930 may include one or more processors (e.g., CPU and/or GPU), memory, and storage. An operating system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 930 may also include one or more cameras, scanners, touchscreens, microphones, speakers, and any other suitable input-output devices.

In particular embodiments, the vehicle 940 may be an autonomous vehicle and equipped with an array of sensors 944, a navigation system 946, and a ride-service computing device 948. In particular embodiments, a fleet of autonomous vehicles 940 may be managed by the transportation management system 960. The fleet of autonomous vehicles 940, in whole or in part, may be owned by the entity associated with the transportation management system 960, or they may be owned by a third-party entity relative to the transportation management system 960. In either case, the transportation management system 960 may control the operations of the autonomous vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the autonomous vehicles 940 may receive data from and transmit data to the transportation management system 960 and the third-party system 970. Example of received data may include, e.g., instructions, new software or software updates, maps, 3D models, trained or untrained machine-learning models, location information (e.g., location of the ride requestor, the autonomous vehicle 940 itself, other autonomous vehicles 940, and target destinations such as service centers), navigation information, traffic information, weather information, entertainment content (e.g., music, video, and news) ride requestor information, ride information, and any other suitable information. Examples of data transmitted from the autonomous vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and/or third-party system 970), and any other suitable data.

In particular embodiments, autonomous vehicles 940 may also communicate with each other as well as other traditional human-driven vehicles, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 960 or third-party system 970).

In particular embodiments, an autonomous vehicle 940 may obtain and process sensor/telemetry data. Such data may be captured by any suitable sensors. In particular embodiments, the autonomous vehicle 940 may include optical cameras that have an image sensor that is configured to capture individual photo images or a series of images as a video. As an example and not by way of limitation, the optical cameras may include a charge-coupled device (CCD) image sensor or a complementary metal-oxide-semiconductor (CMOS) active-pixel image sensor. In particular embodiments, the optical camera may include a lens or lens assembly to collect and focus incoming light onto the focal area of the image sensor. As an example and not by way of limitation, the optical camera may include a fisheye lens, ultra-wide-angle lens, wide-angle lens, or normal lens to focus light onto the image sensor. The optical cameras may be arranged in a circle or ring that is configured to capture images over a 360° panoramic view. In particular embodiments, the optical cameras of the autonomous vehicle 940 may be organized as pre-determined number (e.g., 6) of stereo pairs with overlapping FOVs to capture 3-D visual data. Although this disclosure describes and illustrates particular optical cameras having particular image sensors and lenses arranged in a particular configuration, this disclosure contemplates any suitable optical cameras having any suitable image sensors and lenses arranged in any suitable configuration.

In particular embodiments, an autonomous vehicle 940 may obtain and process sensor/telemetry data. Such data may be captured by any suitable sensors. For example, the vehicle 940 may have aa Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and/or hazards afar. Furthermore, the vehicle 940 may have ultrasound equipment for, e.g., parking and obstacle detection. In addition to sensors enabling the vehicle 940 to detect, measure, and understand the external world around it, the vehicle 940 may further be equipped with sensors for detecting and self-diagnosing the vehicle's own state and condition. For example, the vehicle 940 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on autonomous vehicle 940 in FIG. 9, sensors 944 may be located in any suitable location in or on autonomous vehicle 940. Example locations for sensors include the front and rear bumpers, the doors, the front windshield, on the side panel, or any other suitable location.

In particular embodiments, one or more processing units associated with an autonomous vehicle 940 may receive autonomous-vehicle sensor data that represents an external environment within a threshold distance of the autonomous vehicle 940. In particular embodiments, the computing device may be a ride-service computing device, navigation system, or may be any other suitable computing device associated with the autonomous vehicle 940. The autonomous-vehicle sensor data may be collected via sensors arranged on the outside or the inside of the autonomous vehicle 940. The autonomous-vehicle sensor data may enable the autonomous vehicle 940 to identify objects in the surrounding external environment, such as other vehicles, obstacles, traffic signage, cyclists, or pedestrians.

In particular embodiments, the autonomous-vehicle sensor data may represent a three-dimensional schema of the external environment of the autonomous vehicle 940. As an example and not by way of limitation, the three-dimensional schema may represent the external environment including objects such as other cars and pedestrians up to a maximum range of the sensor array 944 (e.g. 100 meters). In particular embodiments, at least some of the autonomous-vehicle sensor data may be labeled to include references to objects that are within a threshold distance from the autonomous vehicle 940. The autonomous-vehicle sensor data may further enable the autonomous vehicle 940 to identify the road upon which it is driving, lanes in the road, or any other suitable object.

In particular embodiments, an autonomous vehicle 940 may combine the autonomous-vehicle sensor data from multiple types of sensors with other types of data to detect roadways, buildings, traffic signs, and other objects. The other types of data may include data acquired from third parties. Examples of other types of data acquired from third parties include map data, traffic data, weather data, ratings data (e.g. from an online review website or another third-party ratings entity) or any other suitable type of data. Although this disclosure describes receiving sensor data in a particular manner, this disclosure contemplates receiving sensor data in any suitable manner.

In particular embodiments, the autonomous vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the autonomous vehicle 940 may work with a machine learning (ML) model and algorithms. In particular embodiments, the machine learning (ML) model and algorithms may be hosted in one or more GPUs of the computer of the autonomous vehicle 940. In particular embodiments, the machine learning (ML) model may be trained offline to the autonomous vehicle 940. In particular embodiments, the machine learning (ML) model may be trained offline to the autonomous vehicle 940 in a cloud-based solution. In particular embodiments, the autonomous vehicle 940 may synchronize with the cloud for exchanging the image data and machine learning (ML) model parameters. In particular embodiments, the machine learning (ML) model may be a convolutional neural network (CNN) which may process the data and make decision accordingly to guide the vehicle safely. In particular embodiments, the convolutional neural network (CNN) may include object detectors for detecting certain objects, for example, but not limited to, a human, a car, a pet, or other objects. Although this disclosure describes machine learning (ML) model in a particular manner, this disclosure contemplates machine learning (ML) model in any suitable manner.

In particular embodiments, the autonomous vehicle 940 may have a navigation system 946 responsible for safely navigating the autonomous vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the autonomous vehicle 940 to its destinations without colliding into other objects. Although the physical embodiment of the navigation system 946 (e.g., the processing unit) appears in a particular location on autonomous vehicle 940 in FIG. 9, navigation system 946 may be located in any suitable location in or on autonomous vehicle 940. Example locations for navigation system 946 include inside the cabin or passenger compartment of autonomous vehicle 940, near the engine/battery, near the front seats, rear seats, or in any other suitable location.

In particular embodiments, the autonomous vehicle 940 may be equipped with a ride-service computing device 948, which may be a tablet or any other suitable device installed by transportation management system 960 to allow the user to interact with the autonomous vehicle 940, transportation management system 960, other users 901, or third-party systems 970. In particular embodiments, installation of ride-service computing device 948 may be accomplished by placing the ride-service computing device 948 inside autonomous vehicle 940, and configuring it to communicate with the vehicle 940 via a wire or wireless connection (e.g., via Bluetooth). Although FIG. 9 illustrates a single ride-service computing device 948 at a particular location in autonomous vehicle 940, autonomous vehicle 940 may include several ride-service computing devices 948 in several different locations within the vehicle. As an example and not by way of limitation, autonomous vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of autonomous vehicle 940. This may allow users to handle ride-service computing device 948 in a manner consistent with other tablet computing devices. As an example and not by way of limitation, a user may move ride-service computing device 948 to any location in the cabin or passenger compartment of autonomous vehicle 940, may hold ride-service computing device 948, or handle ride-service computing device 948 in any other suitable manner. Although this disclosure describes providing a particular computing device in a particular manner, this disclosure contemplates providing any suitable computing device in any suitable manner.

Figure 10:
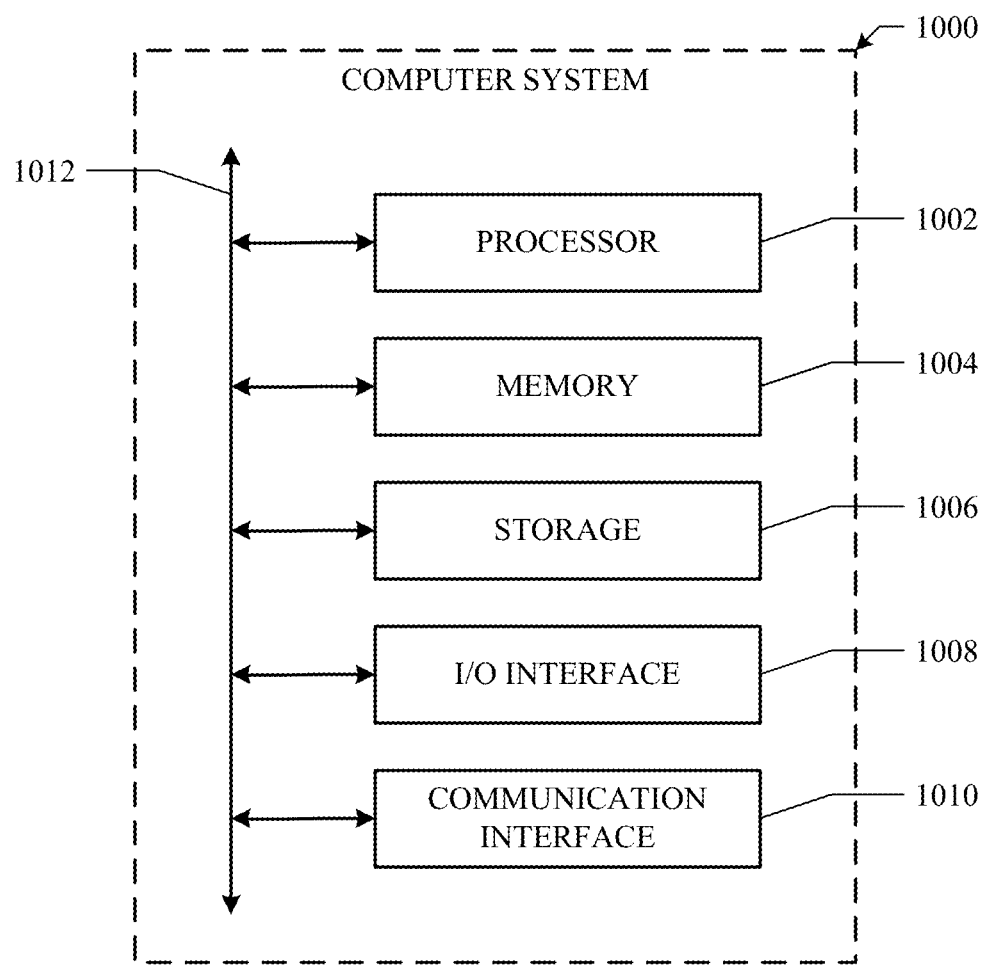
FIG. 10 illustrates an example of a computer.

FIG. 10 illustrates an example computer system 1000. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   detecting a plurality of objects captured within an overlapping region between a first field of view associated with a first camera and a second field of view associated with a second camera;
   determining a respective priority ranking for each object of the plurality of objects;
   selecting an object from the plurality of objects based on the respective priority ranking for the object;
   determining, for the first camera, a first lighting condition associated with the first field of view;
   determining, for the second camera, a second lighting condition associated with the second field of view;
   determining a shared exposure time for the selected object based on the first lighting condition and the second lighting condition; and
   causing at least one image of the selected object to be captured using the shared exposure time.

2. The method of claim 1, wherein the selected object has a highest priority ranking among the plurality of objects.

3. The method of claim 1, wherein the shared exposure time for the first camera and the second camera is based on a weighted average of the first lighting condition and the second lighting condition.

4. The method of claim 3, wherein the shared exposure time for the first camera and the second camera is further based on a third lighting condition associated with the first field of view of the first camera outside the overlapping region, and wherein the third lighting condition has a lower weight that contributes to the weighted average than the first lighting condition and the second lighting condition.

5. The method of claim 1, wherein the shared exposure time for the first camera and the second camera is different from independent exposure times of the first camera and the second camera, and wherein the respective independent exposure times of the first camera and the second camera are determined independently with respect to each other.

6. The method of claim 5, wherein the shared exposure time of the first camera and the second camera is determined based on a weighted average of the respective independent exposure times of the first camera and the second camera.

7. The method of claim 5, wherein the shared exposure time of the first camera and the second camera is determined in response to detecting a difference between the respective independent exposure times of the first camera and the second camera.

8. The method of claim 1, wherein the first camera and the second camera are associated with a stereo camera pair or different stereo camera pairs.

9. The method of claim 1, further comprising causing a subsequent image of a subsequent object of the plurality of objects to be captured using the shared exposure time.

10. The method of claim 1, further comprising:
    selecting a subsequent object from the plurality of objects based on the respective priority ranking for the subsequent object; and
    determining a subsequent exposure time for the selected subsequent object based on the first lighting condition of the first field of view and the second lighting condition of the second field of view.

11. The method of claim 1, wherein a region in the first field of view associated with the first camera excluding the selected object is over-exposed or under exposed to the first camera by using the shared exposure time of the first camera and the second camera.

12. The method of claim 1, further comprising:
    extracting stereo information of the selected object from the at least one captured image; and
    determining three-dimensional perception information for the selected object based on the extracted stereo information.

13. A system comprising:
    one or more non-transitory computer-readable storage media embodying instructions; and
    one or more processors coupled to the non-transitory computer-readable storage media and operable to execute the instructions to:
        detect a plurality of objects captured within an overlapping region between a first field of view associated with a first camera and a second field of view associated with a second camera;
        determine a respective priority ranking for each object of the plurality of objects;
        select an object from the plurality of objects based on the respective priority ranking for the object;
        determine, for the first camera, a first lighting condition associated with the first field of view;
        determine, for the second camera, a second lighting condition associated with the second field of view;
        determine a shared exposure time for the selected object based on the first lighting condition and the second lighting condition; and
        cause at least one image of the selected object to be captured using the shared exposure time.

14. The system of claim 13, wherein the selected object has a highest priority ranking among the plurality of object.

15. The system of claim 13, wherein the shared exposure time for the first camera and the second camera is based on a weighted average of the first lighting condition and the second lighting condition.

16. The system of claim 15, wherein the shared exposure time for the first camera and the second camera is further based on a third lighting condition associated with the first field of view of the first camera outside the overlapping region, and wherein the third lighting condition has a lower weight that contributes to the weighted average than the first lighting condition and the second lighting condition.

17. One or more non-transitory computer-readable storage media embodying software that is operable, when executed by one or more processors of a computing system, to:

detect a plurality of objects captured within an overlapping region between a first field of view associated with a first camera and a second field of view associated with a second camera;

determine a respective priority ranking for each object of the plurality of objects;

select an object from the plurality of objects based on the respective priority ranking for the object;

determine, for the first camera, a first lighting condition associated with the first field of view;

determine, for the second camera, a second lighting condition associated with the second field of view;

determine a shared exposure time for the selected object based on the first lighting condition and the second lighting condition; and cause at least one image of the selected object to be captured using the shared exposure time.

18. The one or more non-transitory computer-readable storage media of claim 17, wherein the selected object has a highest priority ranking among the plurality of objects.

19. The one or more non-transitory computer-readable storage media of claim 17, wherein the shared exposure time for the first camera and the second camera is based on a weighted average of the first lighting condition and the second lighting condition.

20. The one or more non-transitory computer-readable storage media of claim 19, wherein the shared exposure time for the first camera and the second camera is further based on a third lighting condition associated with the first field of view of the first camera outside the overlapping region, and wherein the third lighting condition has a lower weight that contributes to the weighted average than the first lighting condition and the second lighting condition.

* * * * *